US 9,242,204 B2

(12) United States Patent
Iijima (10) Patent No.: US 9,242,204 B2
(45) Date of Patent: Jan. 26, 2016

(54) CARBON DIOXIDE RECOVERY SYSTEM AND METHOD

(75) Inventor: Masaki Iijima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 650 days.

(21) Appl. No.: 13/503,573

(22) PCT Filed: Dec. 17, 2010

(86) PCT No.: PCT/JP2010/072813
§ 371 (c)(1),
(2), (4) Date: Apr. 23, 2012

(87) PCT Pub. No.: WO2011/081040
PCT Pub. Date: Jul. 7, 2011

(65) Prior Publication Data
US 2012/0210874 A1 Aug. 23, 2012

(30) Foreign Application Priority Data

Dec. 28, 2009 (JP) ................................ 2009-298373

(51) Int. Cl.
*B01D 53/00* (2006.01)
*B01D 53/14* (2006.01)
(Continued)

(52) U.S. Cl.
CPC ........ *B01D 53/1475* (2013.01); *B01D 53/1425* (2013.01); *B01D 53/343* (2013.01); *F01K 13/02* (2013.01); *F01K 17/02* (2013.01); *F23J 15/04* (2013.01); *B01D 2252/20484* (2013.01);
(Continued)

(58) Field of Classification Search
None
See application file for complete search history.

(56) References Cited

U.S. PATENT DOCUMENTS 5,344,627 A * 9/1994 Fujii et al. ..................... 423/220
6,620,217 B2 * 9/2003 Bruckmann et al. ............ 55/347
(Continued)

FOREIGN PATENT DOCUMENTS

EP 1473072 A1 11/2004
EP 1688173 A2 8/2006
(Continued)

OTHER PUBLICATIONS

Japanese Decision of a Patent Grant dated May 27, 2014, issued in corresponding Japanese Patent Application No. 2009-298373 with partial translation (2 pages).
(Continued)

*Primary Examiner* — Duane Smith
*Assistant Examiner* — Phillip Shao
(74) *Attorney, Agent, or Firm* — Westerman, Hattori, Daniels & Adrian, LLP (57) ABSTRACT

The carbon dioxide recovery system includes: a first steam line 21a through which low-pressure steam 14L is fed from an intermediate-pressure turbine 12 to a low-pressure turbine 13; a second steam line 21b into which the low-pressure steam 14L is branched from the first steam line 21a; a first regulation valve $V_1$ for regulating the opening of the low-pressure steam 14L from 100% to 0%; a second regulation valve $V_2$ for regulating the opening of the low-pressure steam 14L from 0% to 100% depending on the amount of control provided to the first regulation valve $V_1$; a first auxiliary turbine 22A for recovering power using the low-pressure steam 14L being fed; and a first steam feed line 25L through which exhaust steam 23 discharged from the first auxiliary turbine 22A is supplied as a source of heat to a reboiler 24.

2 Claims, 6 Drawing Sheets

(51) Int. Cl.
  *B01D 53/34* (2006.01)
  *F01K 13/02* (2006.01)
  *F01K 17/02* (2006.01)
  *F23J 15/04* (2006.01)

(52) U.S. Cl.
  CPC . *B01D2252/20489* (2013.01); *B01D 2257/504* (2013.01); *B01D 2258/0283* (2013.01); *F23J 2215/50* (2013.01); *F23J 2219/40* (2013.01); *Y02C 10/04* (2013.01); *Y02C 10/06* (2013.01)

(56) References Cited

U.S. PATENT DOCUMENTS

| | | | | |
|---|---|---|---|---|
| 2004/0221578 | A1* | 11/2004 | Iijima et al. | 60/649 |
| 2004/0261417 | A1* | 12/2004 | Yamashita et al. | 60/679 |
| 2006/0248890 | A1 | 11/2006 | Iijima et al. | |
| 2011/0011088 | A1* | 1/2011 | Iijima et al. | 60/645 |

FOREIGN PATENT DOCUMENTS

| | | |
|---|---|---|
| JP | 03-193116 A | 8/1991 |
| JP | 5-184868 A | 7/1993 |
| JP | 7-232033 A | 9/1995 |
| JP | 2004-323339 A | 11/2004 |
| JP | 2006-213580 A | 8/2006 |

OTHER PUBLICATIONS

Extended European Search Report dated Jul. 11, 2014, issued in corresponding European application No. 10840898.0 (7 pages).
Canadian Notice of Allowance dated Jan. 6, 2014, issued in corresponding Canadian Patent Application No. 2,778,108.
Austrailian Notice of Allowance dated Jan. 14, 2014, issued in corresponding Austrailian Patent Application No. 2010337656.
"Energy and Global Environment" Web URL: http://www.rist.or.jp/atomica/data/dat_detail.php?Title_No=01-04-01-02 (1995) (4 pages) with partial translation.
Written Opinion issued in corresponding application PCT/JP2010/072813 with partial English translation (7 pages), dated Mar. 22, 2011.
International Search Report, issued in corresponding application PCT/JP2010/072813, date of mailing Mar. 22, 2011 (2 pages).
Communication under Rule 71(3) EPC dated Jun. 15, 2015, issued in counterpart European Patent Application No. 10 840 898.0 (40 pages).

* cited by examiner

CARBON DIOXIDE RECOVERY SYSTEM AND METHOD

FIELD

The present invention relates to a carbon dioxide recovery system and a carbon dioxide recovery method that can reliably regenerate a carbon dioxide absorbent even when operation loads of a boiler or a steam turbine in a power generation system vary.

BACKGROUND

The greenhouse effect of $CO_2$ has been recently pointed out as major factor of the global warming phenomenon and it has become an international urgent issue to take measures in preserving earth environments. All fields of human activities that involve burning of fossil fuels are $CO_2$ generation sources, and needs for $CO_2$ emission limitation are becoming increased. Accordingly, methods that enable to bring flue gas of a boiler into contact with an amine $CO_2$ absorbent to reduce or recover $CO_2$ in the flue gas, and methods that enable to store recovered $CO_2$ without releasing $CO_2$ to the atmosphere have been intensively studied for power-generating facilities such as thermal power plants that use a large amount of fossil fuels. As steps that enable to reduce or recover $CO_2$ from flue gas by using a $CO_2$ absorbent as described above, a step of bringing flue gas into contact with a $CO_2$ absorbent in an absorber and a carbon dioxide recovery system that heats an absorbent having absorbed $CO_2$ in a regenerator to liberate $CO_2$ as well as regenerates the absorbent and circulates the regenerated absorbent again in the regenerator to reuse the absorbent are adopted.

This carbon dioxide recovery system causes carbon dioxide contained in gas in the absorber to be absorbed by the absorbent and then be heated in the regenerator, thereby separating the carbon dioxide from the absorbent, so that the separated carbon dioxide is separately recovered and a regenerated absorbent is cyclically used again in the absorber.

Here, to separate and recover carbon dioxide in the regenerator, the absorbent has to be heated in the reboiler and the steam for heating with a predetermined pressure has to be supplied.

Conventionally, it has been suggested that this steam be generated by using some of steam in a power generating plant (see Patent Literature 1).

CITATION LIST

Patent Literature

[Patent Literature 1] Japanese Patent Application Laid-Open No. Hei. 3-193116

Non Patent Literature

[Non-Patent Literature 1] "Energy and Global Environment" http://www.rist.or.jp/atomica/data/dat_detail.php-?Title_No=01-04-01-02

SUMMARY

Technical Problem

However, although a carbon dioxide recovery facility installed along with a chemical plant makes predetermined steam always available, a carbon dioxide recovery facility which is provided in a power generating plant in order to make steam available raises the problem that the steam cannot be supplied under stable pressure conditions to the reboiler of the carbon dioxide recovery facility because despite of variations in operation load depending on power demand, turbine steam may also vary in pressure at this time.

On the other hand, steam used for a carbon dioxide recovery facility may be drawn from a steam turbine system. In this case, the pressure of the steam would be reduced to raise, for example, a strength problem due to an increase in load at the final stage of an intermediate-pressure turbine or the problem of lacking in the output of a boiler water feed pump driving turbine.

That is, in general, when seen from the viewpoint of supply capability, power sources are largely divided into three types of supply capabilities: (1) the base supply capability for allowing operation to be performed all the time at generally constant output; (2) the peak supply capability for allowing operation to be performed in response to variations in power demand, mainly satisfying demand required during the peak; and (3) the middle supply capability for playing an intermediate role therebetween. Efficient operations are performed for each supply capability by employing: for the base supply capability which will have a high capacity factor, a power source which is improved in both long-term economy and fuel procurement stability; for the peak supply capability which will have a low yearly capacity factor and requires load trackability, a power source which is reduced in capital costs and improved in load trackability; and for the middle supply capability, a power source having an intermediate feature therebetween (see Non-Patent Literature 1).

Accordingly, in those power generating plants which employ the peak supply capability or the middle supply capability, a suggestion for such a carbon dioxide recovery system has been desired which can ensure the regeneration of a carbon dioxide absorbent by taking into account a load variation even in the event of a variation in the operation load of the boiler. It has also been desired to construct such a system which can be operated in both the operation mode in which the carbon dioxide recovery unit installed in the power generating plant is operated and the operation mode in which the unit is not operated.

In view of the aforementioned problems, it is an object of the present invention to provide a carbon dioxide recovery system and a method which can perform operations without compromising the regeneration of a carbon dioxide absorbent and affecting the power generation system as well as with a drop in generator output power being reduced as much as possible irrespective of whether carbon dioxide is recovered or not and even in the event of a variation in the operation load of a boiler and a steam turbine.

Solution to Problem

According to an aspect of the present invention, a carbon dioxide recovery system includes: a high-pressure turbine, an intermediate-pressure turbine, and a low-pressure turbine; a boiler for producing steam to drive the turbines; a carbon dioxide recovery unit including a carbon dioxide absorber for allowing a carbon dioxide absorbent to absorb and reduce carbon dioxide in a combustion flue gas discharged from the boiler and a carbon dioxide regenerator for regenerating the carbon dioxide absorbent having absorbed carbon dioxide as a regenerated carbon dioxide absorbent; a first steam line through which low-pressure steam is fed from the intermediate-pressure turbine to the low-pressure turbine; a second steam line into which the low-pressure steam is branched from the first steam line; a first regulation valve disposed on the first steam line to regulate an opening of an amount of steam of the low-pressure steam from 100% to 0%; a second regulation valve disposed on the second steam line to regulate an opening of an amount of steam of the low-pressure steam from 0% to 100% depending on the amount of control provided to the first regulation valve; a first auxiliary turbine coupled to the second steam line to recover power using the low-pressure steam being fed; a first steam feed line through which exhaust steam discharged from the first auxiliary turbine is employed to be fed as a source of heat to a reboiler which is used to regenerate the carbon dioxide absorbent having absorbed carbon dioxide in the carbon dioxide regenerator; a bleed line through which the low-pressure steam having been bled from the first auxiliary turbine is fed to the low-pressure turbine; and a control device for providing control to drive the first auxiliary turbine by controlling an opening from 100% to 0% and from 0% to 100% in carbon dioxide recovery and non-recovery modes in response to a variation in operation load of the boiler or the turbines while a pressure of the exhaust steam supplied to the reboiler is maintained to take on a permissible value for a reboiler optimum pressure (about 0.33 MPa±0.05 MPa) with the first regulation valve and the second regulation valve being operated in response to each other.

According to another aspect of the present invention, a carbon dioxide recovery system includes: a high-pressure turbine, an intermediate-pressure turbine, and a low-pressure turbine; a boiler for producing steam to drive the turbines; a carbon dioxide recovery unit including a carbon dioxide absorber for allowing a carbon dioxide absorbent to absorb and reduce carbon dioxide in a combustion flue gas discharged from the boiler and a carbon dioxide regenerator for regenerating the carbon dioxide absorbent having absorbed carbon dioxide as a regenerated carbon dioxide absorbent; a first steam line through which low-pressure steam is fed from the intermediate-pressure turbine to the low-pressure turbine; a second steam line into which the low-pressure steam is branched from the first steam line; a third steam line into which the low-pressure steam is branched from the first steam line; a first regulation valve disposed on the first steam line to regulate an opening of an amount of steam of the low-pressure steam from 100% to 0%; a second regulation valve disposed on the second steam line to regulate an opening of an amount of steam of the low-pressure steam from 0% to 100% depending on the amount of control provided to the first regulation valve; a third regulation valve disposed on the third steam line to regulate an opening of an amount of steam of the low-pressure steam from 0% to 100% depending on the amount of control provided to the second regulation valve; a first auxiliary turbine coupled to the second steam line to recover power using the low-pressure steam being fed; a first steam feed line through which exhaust steam discharged from the first auxiliary turbine is employed to be fed as a source of heat to a reboiler which is used to regenerate the carbon dioxide absorbent having absorbed carbon dioxide in the carbon dioxide regenerator; a second auxiliary turbine coupled to the third steam line to recover power using the low-pressure steam being fed; a bleed line through which the low-pressure steam discharged from the second auxiliary turbine is fed to the low-pressure turbine; and a control device for providing control to drive the first auxiliary turbine and the second auxiliary turbine by controlling the first regulation valve, the second regulation valve, and the third regulation valve so as to be operated in response to each other in response to a variation in operation load of the boiler or the turbines while a pressure of the exhaust steam supplied to the reboiler is maintained to take on a permissible value for a reboiler optimum pressure (about 0.33 MPa±0.05 MPa).

According to still another aspect of the present invention, a carbon dioxide recovery system includes: a high-pressure turbine, an intermediate-pressure turbine, and a low-pressure turbine; a boiler for producing steam to drive the turbines; a carbon dioxide recovery unit including a carbon dioxide absorber for allowing a carbon dioxide absorbent to absorb and reduce carbon dioxide in a combustion flue gas discharged from the boiler and a carbon dioxide regenerator for regenerating the carbon dioxide absorbent having absorbed carbon dioxide as a regenerated carbon dioxide absorbent; a first steam bleed line into which steam is bled from an inlet of the low-pressure turbine; a first auxiliary turbine coupled to the first steam bleed line to recover power using the bled steam; a first steam feed line through which exhaust steam discharged from the first auxiliary turbine is employed to be fed as a source of heat to a reboiler which is used to regenerate the carbon dioxide absorbent having absorbed carbon dioxide in the carbon dioxide regenerator; and a control device for providing control to drive the first auxiliary turbine in response to a variation in operation load of a boiler or a steam turbine of a power generation system while a pressure of the exhaust steam supplied to the reboiler is maintained to take on a reboiler optimum permissible value. The intermediate-pressure turbine has a capacity which can accommodate an increase in load resulting from a decrease in back pressure.

Advantageously, the carbon dioxide recovery system further includes a bypass line which bypasses the first auxiliary turbine from the first steam bleed line so as to supply steam directly to the reboiler.

Advantageously, in the carbon dioxide recovery system, the first auxiliary turbine or the second auxiliary turbine is used to recover power from any one of a pump, a blower, and a compressor which are used in the carbon dioxide recovery system.

According to still another aspect of the present invention, a carbon dioxide recovery method including using the carbon dioxide recovery system according to any one of above to recover carbon dioxide which has been absorbed in the carbon dioxide absorbent.

Advantageous Effects of Invention

According to the present invention, even in the event of a variation in operation load of a boiler or a steam turbine in a power generation system, steam can be supplied with stability to a reboiler for regenerating a carbon dioxide absorbent in consideration of the variation in load and the regeneration of the absorbent is ensured, so that carbon dioxide can be recovered with stability.

DESCRIPTION OF EMBODIMENTS

Now, the invention will be described in more detail below with reference to the drawings. Note that these embodiments will not limit the invention. Furthermore, the components of the embodiments below will include those that one skilled in the art can readily assume or are substantially identical.

First Embodiment

Figure 1:
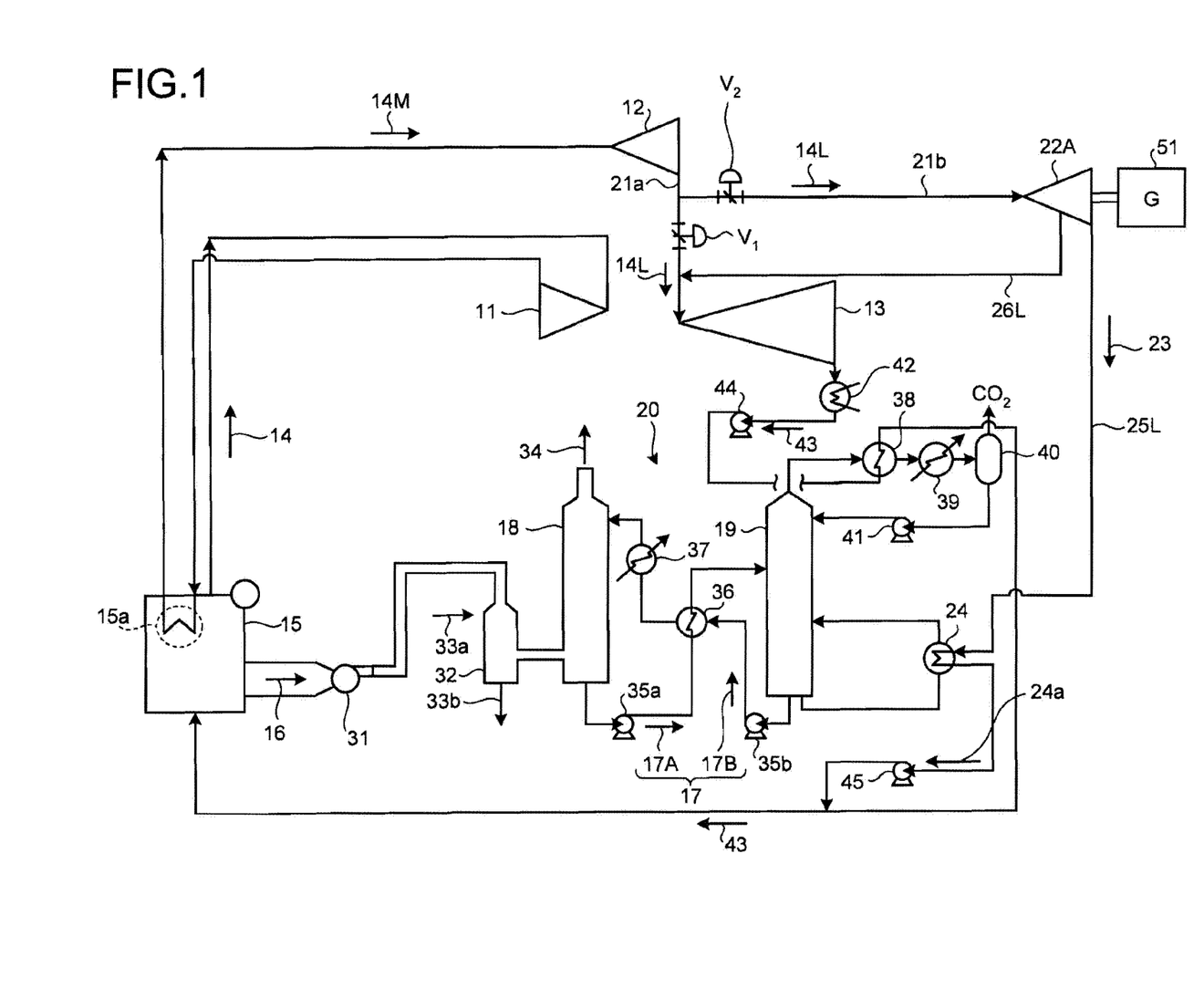
FIG. 1 is a schematic diagram illustrating a carbon dioxide recovery system.
Figure 2:
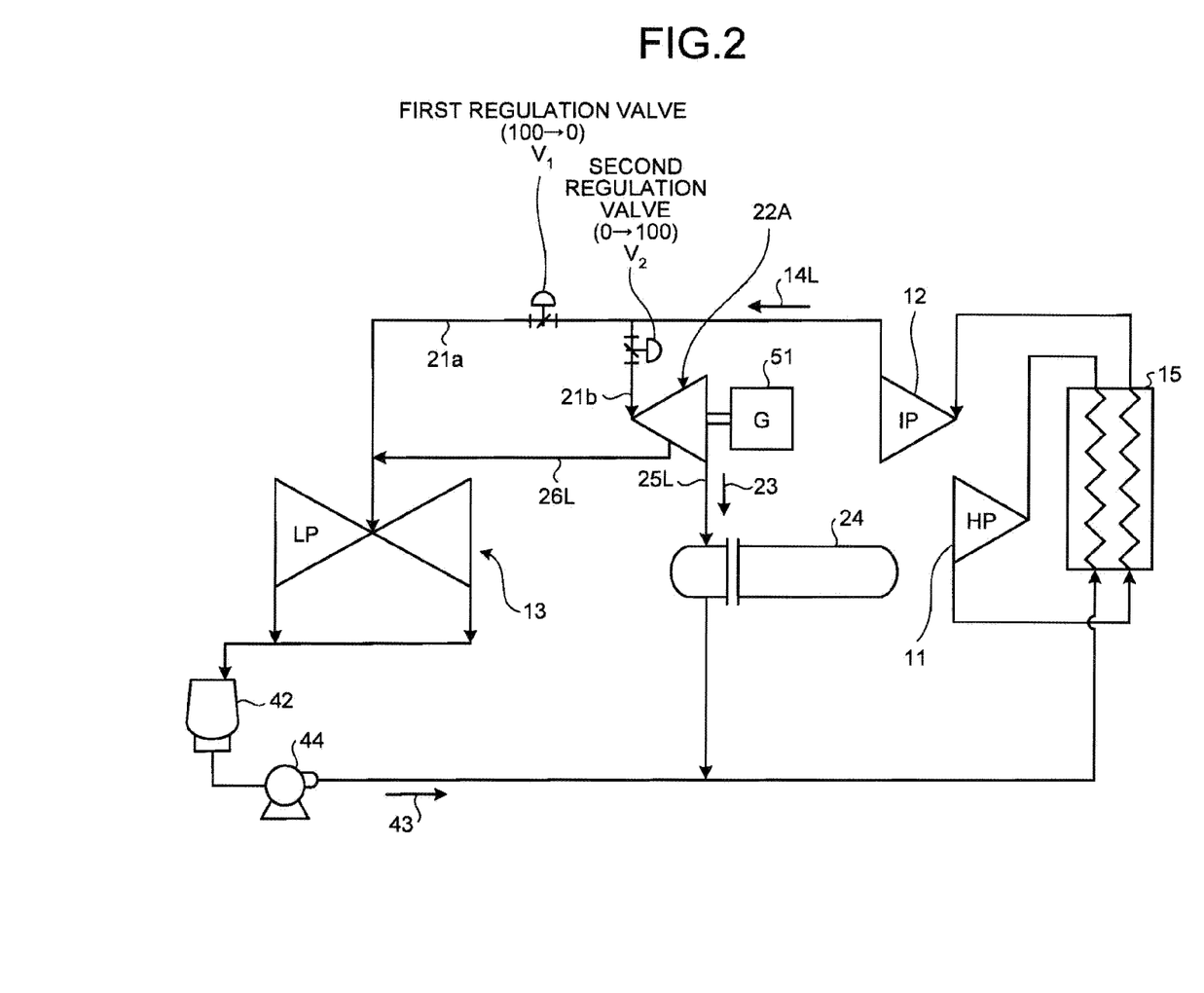
FIG. 2 is a conceptual diagram illustrating a steam pipe system according to an embodiment.

Referring to the drawings, a description will be made to a carbon dioxide recovery system according to this embodiment of the present invention. FIG. 1 is a schematic diagram illustrating the carbon dioxide recovery system. FIG. 2 is a conceptual diagram illustrating a steam pipe system according to this embodiment, in which a turbine coaxially drives a single generator. Note that a turbine may have multiple shafts to drive different generators.

As shown in FIGS. 1 and 2, the carbon dioxide recovery system according to this embodiment includes: a high-pressure turbine 11, an intermediate-pressure turbine 12, and a low-pressure turbine 13; a boiler 15 for producing steam 14 to drive the turbines; a carbon dioxide recovery unit 20 which has a carbon dioxide absorber (absorber) 18 and a carbon dioxide regenerator (regenerator) 19, the absorber 18 allowing a carbon dioxide absorbent 17 to absorb and reduce carbon dioxide in a combustion flue gas 16 discharged from the boiler 15, the regenerator 19 allowing a carbon dioxide absorbent 17A having absorbed the carbon dioxide to emit the carbon dioxide and regenerating the absorbent as a regenerated carbon dioxide absorbent 17B; a first steam line 21a through which the low-pressure steam 14L is fed from the intermediate-pressure turbine 12 to the low-pressure turbine 13; a second steam line 21b into which the low-pressure steam 14L is branched from the first steam line 21a; a first regulation valve $V_1$ disposed on the first steam line 21a and regulating the opening of an amount of steam of the low-pressure steam 14L from 100% to 0%; a second regulation valve $V_2$ disposed on the second steam line 21b and regulating the opening of an amount of steam of the low-pressure steam 14L from 0% to 100% depending on the amount of control provided to the first regulation valve $V_1$; a first auxiliary turbine 22A coupled to the second steam line 21b to recover power using the low-pressure steam 14L being fed; a first steam feed line 25L through which exhaust steam 23 discharged from the first auxiliary turbine 22A is employed to be fed as a source of heat to a reboiler 24 which is used to regenerate the carbon dioxide absorbent 17A having absorbed carbon dioxide in the carbon dioxide regenerator 19; a bleed line 26L through which the low-pressure steam 14L having been bled from the first auxiliary turbine 22A is fed to the low-pressure turbine 13; and a control device for providing control to drive the first auxiliary turbine 22A by controlling an opening from 100% to 0% and from 0% to 100% in carbon dioxide recovery and non-recovery modes in response to a variation in operation load of the boiler 15 or the turbines (the high-pressure turbine 11, the intermediate-pressure turbine 12, and the low-pressure turbine 13) while the pressure of the exhaust steam 23 supplied to the reboiler 24 is maintained to take on a permissible value for a reboiler optimum pressure (about 0.33 MPa±0.05 MPa) with the first regulation valve $V_1$ and the second regulation valve $V_2$ being operated in response to each other.

Here, the carbon dioxide absorbent 17 is composed of the carbon dioxide absorbent (rich solution) 17A which has absorbed carbon dioxide in the absorber 18 and the carbon dioxide absorbent (lean solution) 17B which has emitted carbon dioxide and has been regenerated in the regenerator 19. The carbon dioxide absorbent 17 is to be circulated through the absorber 18 and the regenerator 19 and thereby recycled.

In FIG. 1, the combustion flue gas 16 containing carbon dioxide ($CO_2$) from the boiler 15 is increased in pressure by a boiler combustion flue gas blower 31, then fed to a combustion flue gas cooler 32, cooled down by cooling water 33a, and fed to the absorber 18, and cooling drain water 33b is emitted out of the system. In the absorber 18, the combustion flue gas 16 interactively contacts the carbon dioxide absorbent 17, which is regenerated and may be, for example, alkanolamine-based, so that $CO_2$ in the combustion flue gas 16 is absorbed in the absorbent 17 by chemical reaction. A combustion flue gas 34 with $CO_2$ reduced in amount is emitted out of the system.

On the other hand, the absorbent (rich solution) 17A having absorbed $CO_2$ is increased in pressure by a rich sorbent pump 35a, then heated with the absorbent (lean solution) 17B having been regenerated in a rich/lean sorbent heat exchanger 36, and fed to the regenerator 19.

At the lower portion of the regenerator 19, the absorbent 17 is heated by the exhaust steam (0.33 MPa) 23 supplied in the reboiler 24. The steam-laden $CO_2$ is guided from the top of the regenerator 19 to an overhead condenser 38.

The condensed water 24a which has been condensed from low-pressure steam in the reboiler 24 is increased in pressure in a reboiler condensate pump 45 and then mixed with preheated boiler feed water 43 to increase the temperature of the boiler feed water 43. Then, the boiler feed water 43 having been increased in temperature is fed to the boiler 15.

The steam-laden $CO_2$ emitted from the regenerator 19 allows the overhead condenser 38 to preheat the low-pressure boiler feed water 43 increased in pressure by a low-pressure water feed pump 44, then cooled by an overhead cooler 39, and separated from water by a separator 40. The $CO_2$ is directed to a separate step to be compressed by a compressor (not shown) and dehydrated to be delivered through a pipe line (not shown).

The water separated in the separator 40 is fed by a condensed-water circulation pump 41 to the regenerator 19. The absorbent (lean solution) 17B is increased in pressure by a lean sorbent pump 35b, cooled by the $CO_2$ absorbent (rich solution) 17A having absorbed $CO_2$ in the rich/lean sorbent heat exchanger 36, further cooled in a lean sorbent cooler 37, and then fed to the absorber 18.

On the other hand, the high-pressure high-temperature steam 14 which has been produced and heated by the boiler 15 drives the high-pressure turbine 11, and thereafter, is reheated as a high-pressure turbine exhaust gas by a repeater 15a in the boiler 15 so as to be fed to the intermediate-pressure turbine 12 as the reheated intermediate-pressure steam 14M and subsequently fed to the low-pressure turbine 13 as the low-pressure steam 14L.

Then, when no carbon dioxide is recovered in the power generating plant, the first regulation valve $V_1$ is set to an opening of 100% and the second regulation valve $V_2$ is set to an opening of 0%, allowing the low-pressure steam 14L to be supplied to the first steam line 21a and the total amount of the low-pressure steam 14L to be supplied to the low-pressure turbine 13.

Now, when carbon dioxide is recovered in the power generating plant, the opening of the first regulation valve $V_1$ is controlled from 100% to 0% and the opening of the second regulation valve $V_2$ is controlled from 0% to 100%. Then, the low-pressure steam 14L is switched over to the second steam line 21b by means of a control device (not shown) and the total amount of the low-pressure steam 14L to be supplied to the first auxiliary turbine 22A.

Then, even when the power generating plant is varied in load from 100% to 80%, 75%, and 50%, the pressure of the exhaust steam 23 to be supplied to the reboiler 24 is maintained all the time to take on a permissible value for the reboiler optimum pressure (about 0.33 MPa±0.05 MPa), only allowing a variation in pressure of the low-pressure steam 14L bled from the first auxiliary turbine 22A.

Accordingly, when carbon dioxide is recovered in the power generation system, a large amount of the low-pressure steam 14L required in the reboiler 24 can be smoothly made available successfully with a reduced energy loss.

Figure 6:
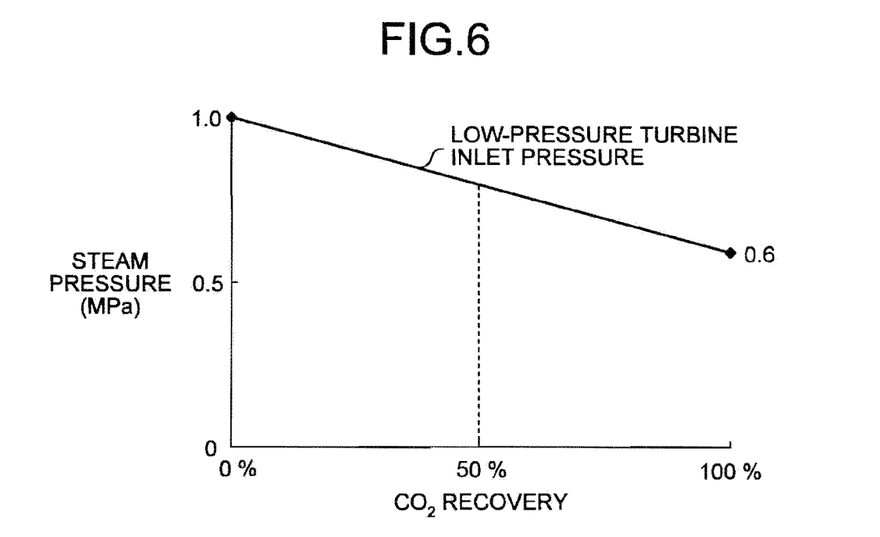
FIG. 6 is a graph showing the relationship between the recovery of carbon dioxide and the steam pressure of low-pressure steam.

FIG. 6 is a view illustrating the relationship between the recovery of carbon dioxide and the steam pressure of low-pressure steam. As shown in FIG. 6, when no carbon dioxide is recovered, the total amount of the low-pressure steam 14L is fed under a steam pressure of 1.0 MPa to the low-pressure turbine 13 through the first steam line 21a.

On the other hand, when carbon dioxide is recovered, the low-pressure steam 14L is maintained all the time to take on a permissible value for the reboiler optimum pressure (about 0.33 MPa±0.05 MPa), and depending on the recovery rate thereof, the low-pressure steam 14L bled from the bleed line 26L is fed to the low-pressure turbine 13.

Figure 7:
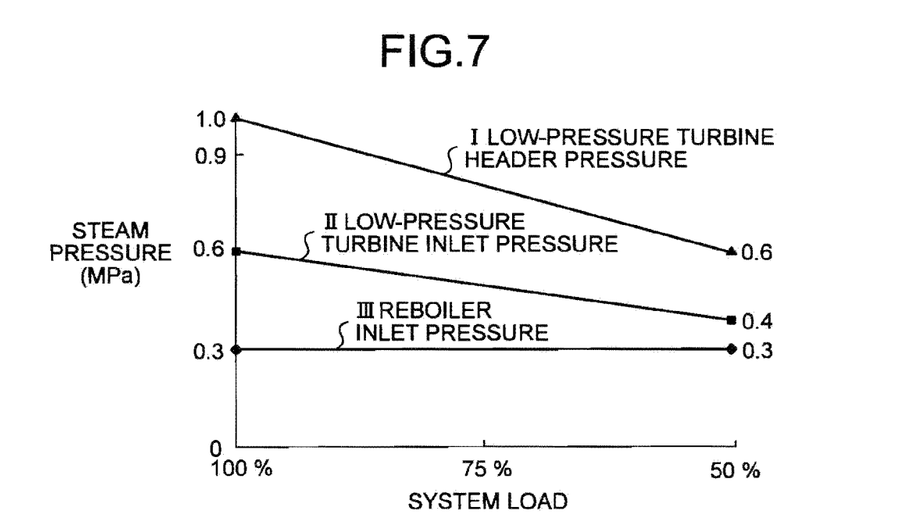
FIG. 7 is a graph showing a change in each of a pressure curve representative of the header pressure of a low-pressure turbine, a pressure curve representative of the inlet pressure thereof, and a pressure curve representative of the inlet pressure of a reboiler, depending on the system load of a power generating plant.

FIG. 7 is a view illustrating a change in each of the pressure curve (I) of the header pressure of the low-pressure turbine, the pressure curve (II) of the inlet pressure, and the pressure curve (III) of the reboiler inlet pressure, according to the system load (100%, 75%, and 50%) of the power generating plant.

As shown in FIG. 7, since the pressure is maintained at a permissible value for the reboiler optimum pressure (about 0.33 MPa±0.05 MPa), there is no change in the reboiler inlet pressure curve (III).

In contrast to this, as the system load increases, the pressure curve (I) of the low-pressure turbine header pressure decreases.

Such a decrease in the inlet pressure of the low-pressure turbine 13 means that the back pressure of the intermediate-pressure turbine 12 is reduced.

Figure 5:
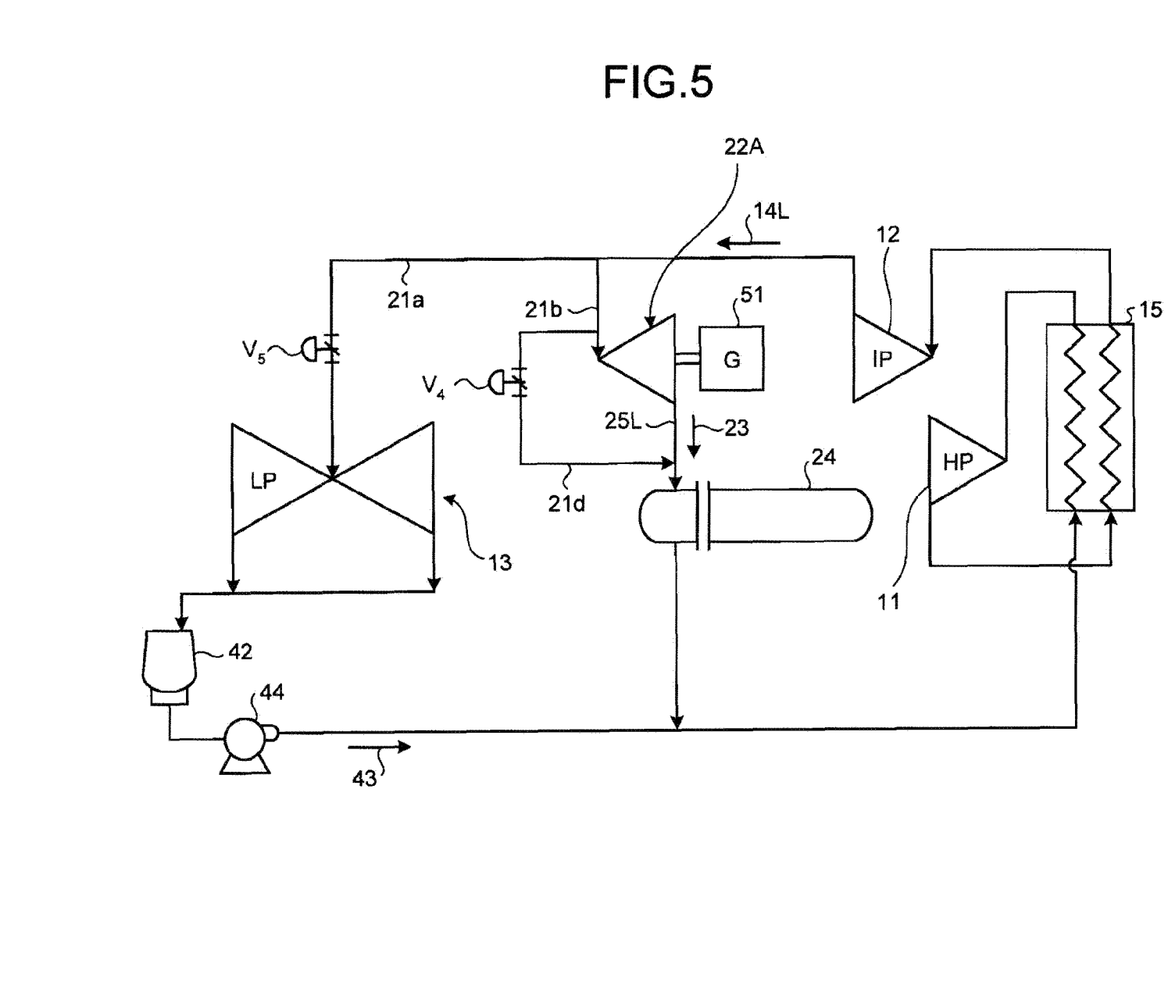
FIG. 5 is a conceptual diagram illustrating a steam pipe system according to a reference example.

FIG. 5 is a conceptual diagram of a steam pipe system according to a reference example.

As shown in FIG. 5, to recover carbon dioxide in an existing power generating plant facility, a carbon dioxide recovery facility may be provided so that the steam 14 used for the reboiler 24 is obtained from the power generating plant. In this case, for example, it may be suggested that some of the low-pressure steam 14L being fed from the intermediate-pressure turbine 12 to the low-pressure turbine 13 be bled. However, although a sufficient steam pressure can be made available for a 100% load, the pressure may vary a great deal for a 50% load. In this case, for example, as shown in FIG. 5, the first steam line 21a may be provided with a pressure reducing valve $V_5$ to accommodate the pressure variation. However, in this case, a pressure loss caused by the pressure reducing valve $V_5$ leads to a power generation loss of about 5%. Note that symbol 21d indicates a bypass line for bypassing the first auxiliary turbine 22A in the case of a drop in pressure.

Figure 4:
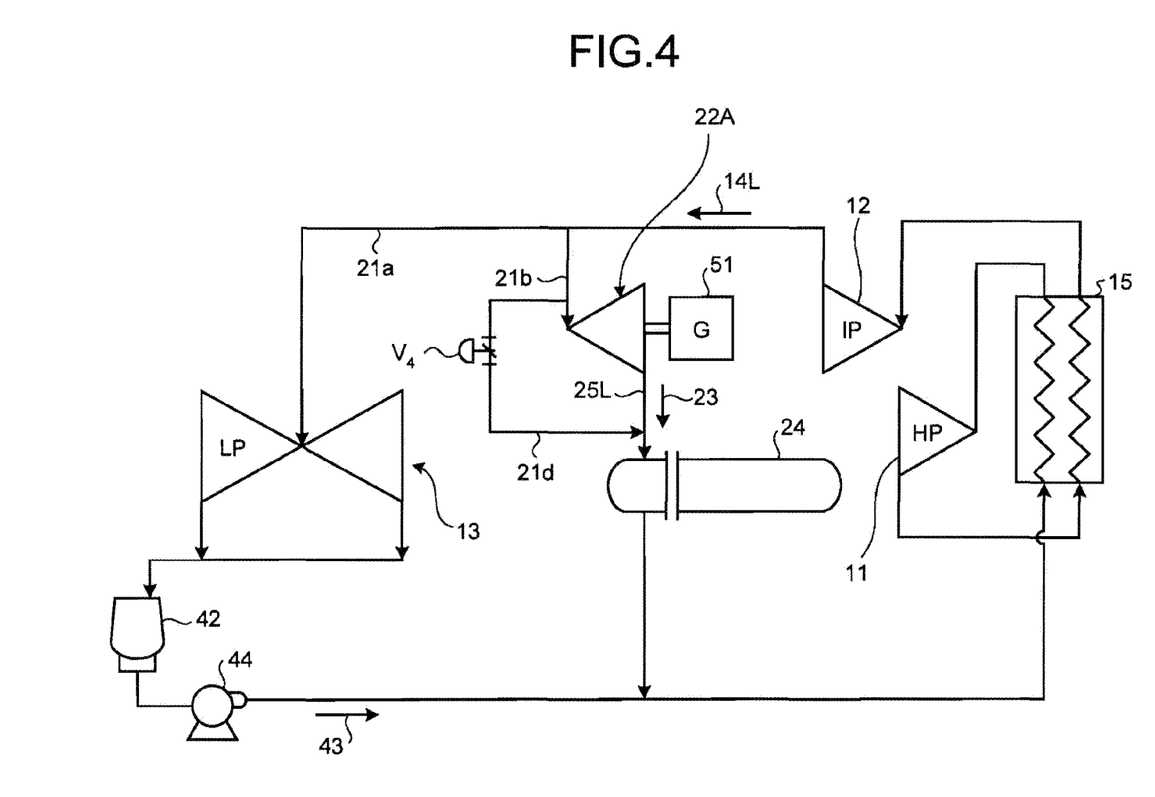
FIG. 4 is a conceptual diagram illustrating another steam pipe system according to an embodiment.

FIG. 4 is a conceptual diagram showing another steam pipe system according to an embodiment. As shown in FIG. 4, to eliminate the pressure variation, the intermediate-pressure turbine 12 needs to be sufficiently increased in capacity to permit the pressure variation and enhanced in strength. It is thus possible to accommodate the pressure variation for a 50% load by providing the intermediate-pressure turbine 12 having a large capacity (or a 1.0/0.6 times cross-sectional area). As shown in FIG. 7, the cross-sectional area is changed by a factor or a ratio of (back pressure for 100%/back pressure for 50%) so as to accommodate an increase in load with decreasing back pressure because a low-pressure turbine header pressure (=an intermediate-pressure turbine back pressure) is 1.0 MPa for 100% load and changed to 0.6 MPa for 50% load.

Note that such a change in the specification of the intermediate-pressure turbine 12 cannot be made in existing facilities, but is possible in a new plant.

As can be seen from above, although the header pressure of the low-pressure turbine is abruptly decreased for 50% load, the present invention eliminates such a pressure variation and thus no measures need to be taken to increase the capacity of the intermediate-pressure turbine 12 as shown in FIG. 4. Furthermore, with no change being made to the existing capacity of the intermediate-pressure turbine 12, the first regulation valve $V_1$ and the second regulation valve $V_2$ can be switched over to supply the total amount of the low-pressure steam 14L to the first auxiliary turbine 22A. Additionally, while the pressure of the exhaust steam 23 supplied to the reboiler 24 is maintained to take on a permissible value for the reboiler optimum pressure (about 0.33 MPa±0.05 MPa), only the excess of the steam can be supplied to the low-pressure turbine 13 as bled steam. It is thus possible to provide adequate operation all the time.

In this manner, the total amount of the low-pressure steam 14L is used to recover power by the first auxiliary turbine 22A. Subsequently, the exhaust steam 23 discharged from the first auxiliary turbine 22A is employed to be fed as a source of heat through the first steam feed line 25L to the reboiler 24 which is used to regenerate the carbon dioxide absorbent 17A having absorbed carbon dioxide in the carbon dioxide regenerator 19.

Accordingly, for the first auxiliary turbine 22A, a control device (not shown) provides control to drive the first auxiliary turbine 22A equipped with a generator 51 in response to variations in operation load of the boiler 15 of the power generation system or the steam turbines (the high-pressure turbine 11, the intermediate-pressure turbine 12, and the low-pressure turbine 13) while the pressure of the exhaust steam 23 supplied to the reboiler 24 is maintained to take on a reboiler optimum permissible value (for example, about 0.33 MPa±0.05 MPa). Note that the reboiler optimum permissible value is shown by way of example and can be varied, as appropriate, depending on various conditions such as the composition of the absorbent or the regenerator facility.

The exhaust gas from the low-pressure turbine 13 is condensed in a steam condenser 42, while the condensed water is fed as the boiler feed water 43 by the boiler feed water pump 44 to the overhead condenser 38.

Note that the carbon dioxide absorbent 17 which absorbs $CO_2$ may be, for example, an amine-based absorbent. Specifically, examples thereof include as alkanolamine, monoethanolamine, diethanolamine, triethanolamine, methyldiethanolamine, diisopropanolamine, and diglycolamine, and as well hindered amines, and the single solution of each thereof or a mixture solution of two or more thereof may be employed. Typically, a monoethanolamine solution is preferably employed.

Concerning the carbon dioxide recovery system according to the present embodiment, a description will be made to an example step of providing control in response to an actual load using the carbon dioxide recovery system of FIGS. 1 and 2.

1) First, a control device (not shown) receives information regarding whether to recover carbon dioxide or not in the current power generation facility.
2) In the operation mode in which no carbon dioxide is recovered, with the first regulation valve $V_1$ being set to an opening of 100% and the second regulation valve $V_2$ set to an opening of 0%, the low-pressure steam 14L is supplied to the first steam line 21a to feed the total amount thereof to the low-pressure turbine 13.
3) Subsequently, in the operation mode in which power is continuously generated while carbon dioxide is recovered, the control device issues a command for controlling the opening of the first regulation valve $V_1$ from 100% to 0% as well as a command for controlling the opening of the second regulation valve $V_2$ from 0% to 100%. This causes the low-pressure steam 14L to be fed to the second steam line 21b and the total amount thereof to be supplied to the first auxiliary turbine 22A so as to perform an operation of maintaining a permissible value for the reboiler optimum pressure (about 0.33 MPa±0.05 MPa) all the time, thereby ensuring the regeneration of the absorbent 17 in the regenerator 19.
4) Next, upon reception of such information that the power generating plant is varied in load from 100% to 80%, 75%, and 50%, the operation load information is received.
5) Then, based on the load information, the control device (not shown) receives information regarding the pressure of the low-pressure steam 14L, which is fed to the inlet of the low-pressure turbine 13 and to the first auxiliary turbine 22A, and provides control to drive the first auxiliary turbine 22A while the pressure of the exhaust steam 23 supplied to the reboiler 24 is maintained to take on a permissible value for the reboiler optimum pressure (for example, about 0.33 MPa). It is thus possible to regenerate the absorbent 17 with stability.

As such, according to the present embodiment, even when the power generating plant is varied in load from 100% to 80%, 75%, and 50%, the pressure of the exhaust steam 23 supplied to the reboiler 24 is maintained all the time to take on a permissible value for the reboiler optimum pressure (about 0.33 MPa±0.05 MPa), allowing only a variation in the pressure of the low-pressure steam 14L bled from the first auxiliary turbine 22A. When $CO_2$ is recovered in the power generation system, it is thus possible to use the intermediate-pressure turbine 12 of an existing capacity and make a large amount of the low-pressure steam 14L required in the reboiler 24 smoothly available successfully with a reduced energy loss.

As can be seen from above, the present invention allows for incorporating a carbon dioxide recovery facility without changing the structure of the steam system in a power generation system as well as for reducing the output of the power generation system by power-recovering low-pressure turbine inlet steam in the first auxiliary turbine 22A.

Furthermore, even in the event of a load variation (100% to 50%) of the boiler 15 and the steam turbines (the high-pressure turbine 11, the intermediate-pressure turbine 12, and the low-pressure turbine 13), control can be provided to maintain a constant outlet pressure of the exhaust steam 23 from the first auxiliary turbine 22A, so that a permissible optimum pressure value (for example, about 0.33 MPa±0.05 MPa) for the reboiler 24 of the carbon dioxide recovery facility is maintained in the entire load range of the plant. This makes it possible to regenerate the absorbent 17 with stability all the time.

Figure 3:
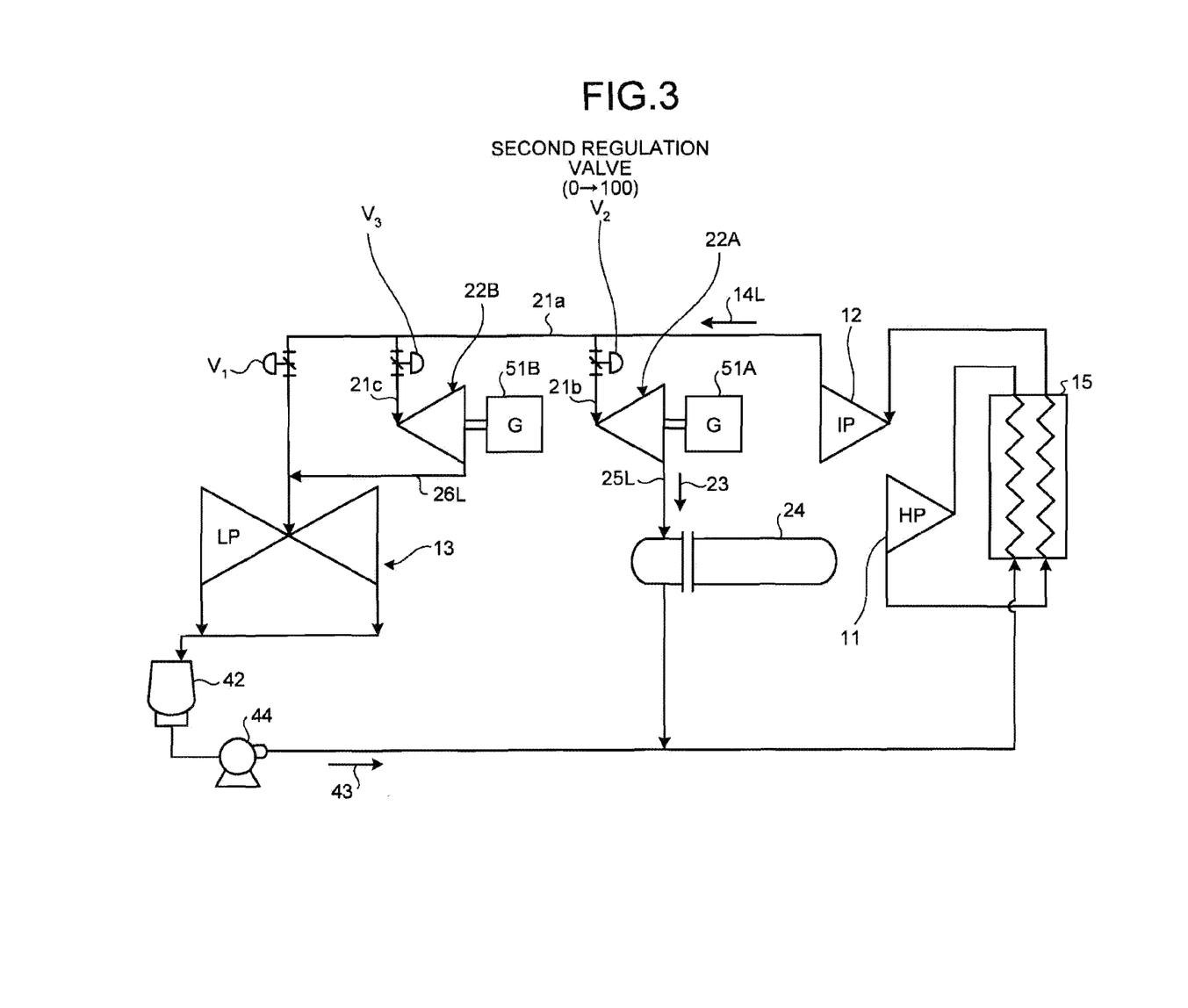
FIG. 3 is a conceptual diagram illustrating another steam pipe system according to an embodiment.

FIG. 3 is a conceptual diagram of another steam pipe system according to an embodiment. In FIG. 3, two auxiliary turbines (22A, 22B) are provided.

In addition to the carbon dioxide recovery system shown in FIG. 1, the carbon dioxide recovery system of FIG. 3 further includes: a third steam line 21c into which the low-pressure steam 14L is branched from the first steam line 21a; a third regulation valve $V_3$ disposed on the third steam line 21c and regulating the opening of an amount of steam of the low-pressure steam 14L from 0% to 100% depending on the amount of control provided to the second regulation valve $V_2$; the first auxiliary turbine 22A coupled to the second steam line 21b and configured to recover power using the low-pressure steam 14L being fed; the first steam feed line 25L through which the exhaust steam 23 discharged from the first auxiliary turbine 22A is employed to be fed as a source of heat to the reboiler 24 which is used to regenerate the carbon dioxide absorbent 17A having absorbed carbon dioxide in the carbon dioxide regenerator 19; a second auxiliary turbine 22B coupled to the third steam line 21c and configured to recover power using the low-pressure steam 14L being fed; the bleed line 26L through which the low-pressure steam 14L discharged from the second auxiliary turbine 22B is supplied to the low-pressure turbine 13; and a control device for providing control to drive the first auxiliary turbine 22A and the second auxiliary turbine 22B by controlling the first regulation valve $V_1$, the second regulation valve $V_2$, and the third regulation valve $V_3$ so as to be operated in response to each other in response to variations in operation load of the boiler 15 or the turbines (the high-pressure turbine 11, the intermediate-pressure turbine 12, and the low-pressure turbine 13) while the pressure of the exhaust steam 23 supplied to the reboiler 24 is maintained to take on a permissible value for the reboiler optimum pressure (about 0.33 MPa±0.05 MPa).

The first auxiliary turbine 22A is configured such that the low-pressure steam 14L supplied to the reboiler 24 is maintained to take on a permissible value of the optimum pressure (about 0.33 MPa±0.05 MPa), whereas the excess thereof is employed for recovery of energy by means of the second auxiliary turbine 22B.

TEST EXAMPLE

Now, test examples showing the effects of the present invention will be described below. However, the present invention is not limited thereto.

Table 1 shows the rate of reduction in the amount of power transmission in the process which incorporates the method of the present invention, to which the process of FIG. 1 is applied, in a coal combustion thermal power facility having a power generation capacity of 900 MW.

Note that the generator output power of the main turbine was used as a reference when no carbon dioxide is recovered.

A reference example 1 shows a case of 100% load with the main-turbine generator output power being 912 MW.

On the other hand, a reference example 2 shows a case of a load variation (50% load) with the main-turbine generator output power being about a half or 454 MW.

In contrast to this, the low-pressure steam 14L is supplied to the first steam line 21a to allow the first auxiliary turbine 22A to recover power using the low-pressure steam 14L having been bled, and the operation of the first auxiliary turbine 22A is controlled so that the exhaust steam 23 discharged from the first auxiliary turbine 22A takes on a permissible value for the reboiler optimum pressure (about 0.33 MPa±0.05 MPa). At this time, a decrease in transmission output power was checked against a power generation system load of 100% and 50%. The results are shown in Table 1.

TABLE 1

|  |  | Reference example 1 | Reference example 2 | Test example 1 | Test example 2 | Comparative example 1 | Comparative example 2 |
|---|---|---|---|---|---|---|---|
| Power generation system load |  | 100% | 50% | 100% | 50% | 100% | 50% |
| LP inlet steam | °C. | 329 | 341 | 329 | 298 | 329 | 298 |
|  | Mpa | 1.06 | 0.51 | 0.68 | 0.33 | 0.68 | 0.21 |
|  | Ton/h | 1915 | 983 | 1207 | 653 | 1207 | 653 |
|  | Kcal/Kg | 742.8 | 751.4 | 721 | 735 | 742.8 | 735 |
| Reboiler inlet steam | °C. | — | — | 215 | 298 | 215 | 298 |
|  | Mpa | — | — | 0.33 | 0.33 | 0.33 | 0.33 |
|  | Ton/h | — | — | 708 | 330 | 708 | 330 |
|  | Kcal/Kg | — | — | 691 | 735 | 691 | 735 |
| Main-turbine generator output power | MW | 912 | 454 | 749 | 382.7 | 758.5 | 374.7 |
| Auxiliary-turbine generator output power | MW | — | — | 57.6 | 18.7 | 28.6 | 8.4 |
| Decrease in turbine generator output power | MW | — | — | 105.4 | 48.6 | 124.9 | 70.9 |
|  | % | — | — | 11.6 | 10.8 | 13.7 | 15.6 |
| $CO_2$ recovery unit  Blower | MW | — | — | 6 | 3 | 6 | 3 |
|  Pump | MW | — | — | 4.5 | 3 | 4.5 | 3 |
| Major power Compressor consumption | MW | — | — | 57 | 40 | 57 | 40 |
| Decrease in transmission output power (ratio to generator output power) | MW | — | — | 172.9 | 94.6 | 192.4 | 116.9 |
|  | % | — | — | 19.0 | 20.8 | 21.1 | 25.7 |

As shown in Table 1 (100% load), for the test example 1, the decrease in transmission output power was found to be 19.0%, which is lower than 21.1% for the comparative example 1.

As shown in Table 1 (50% load), for the test example 2, the decrease in transmission output power was found to be 20.8%, which is lower than 25.7% for the comparative example 2.

INDUSTRIAL APPLICABILITY

As described above, according to the carbon dioxide recovery system and the method of the present invention, even in the event of a variation in the operation load of the boiler and the steam turbines, it is possible to take a load variation into account in supplying steam with stability to a reboiler for regenerating a carbon dioxide absorbent, and ensure the regeneration of the absorbent having processed carbon dioxide of the combustion flue gas in the power generation facility.

REFERENCE SIGNS LIST 11 high-pressure turbine
12 intermediate-pressure turbine
13 low-pressure turbine
14 steam
14L low-pressure steam
14M intermediate-pressure steam
15 boiler
16 combustion flue gas
17 carbon dioxide absorbent
17A carbon dioxide absorbent having absorbed carbon dioxide (rich solution)
17B regenerated carbon dioxide absorbent (lean solution)
18 carbon dioxide absorber (absorber)
19 carbon dioxide regenerator (regenerator)
20 carbon dioxide recovery unit
21a first steam line
21b second steam line
22A first auxiliary turbine
22B second auxiliary turbine
23 exhaust steam
24 reboiler

The invention claimed is:

1. A carbon dioxide recovery system, comprising:
a high-pressure turbine, an intermediate-pressure turbine, and a low-pressure turbine;
a boiler for producing steam to drive the turbines;
a carbon dioxide recovery unit including a carbon dioxide absorber for allowing a carbon dioxide absorbent to absorb and reduce carbon dioxide in a combustion flue gas discharged from the boiler and a carbon dioxide regenerator for regenerating the carbon dioxide absorbent having absorbed carbon dioxide as a regenerated carbon dioxide absorbent;
a first steam line through which low-pressure steam is fed from the intermediate-pressure turbine to the low-pressure turbine;
a second steam line into which the low-pressure steam is branched from the first steam line;
a first regulation valve disposed on the first steam line to regulate an opening of an amount of steam of the low-pressure steam from 100% to 0%;
a second regulation valve disposed on the second steam line to regulate an opening of an amount of steam of the low-pressure steam from 0% to 100% depending on the amount of control provided to the first regulation valve;
a first auxiliary turbine coupled to the second steam line to recover power using the low-pressure steam being fed;
a first steam feed line through which exhaust steam discharged from the first auxiliary turbine is employed to be fed as a source of heat to a reboiler which is used to regenerate the carbon dioxide absorbent having absorbed carbon dioxide in the carbon dioxide regenerator;

a bleed line through which the low-pressure steam having been bled from the first auxiliary turbine is fed to the low-pressure turbine; and a control device configured to control driving of the first auxiliary turbine by controlling an opening from 100% to 0% and from 0% to 100% in carbon dioxide recovery and non-recovery modes in response to a variation in operation load of the boiler or the turbines while a pressure of the exhaust steam supplied to the reboiler is maintained to take on a permissible value for a reboiler optimum pressure (about 0.33 MPa±0.05 MPa) with the first regulation valve and the second regulation valve being operated in response to each other.

2. A carbon dioxide recovery method including using the carbon dioxide recovery system according to claim 1 to recover carbon dioxide which has been absorbed in the carbon dioxide absorbent.

\* \* \* \* \*